(12) United States Patent
Toliver et al.

(10) Patent No.: US 6,941,972 B2
(45) Date of Patent: Sep. 13, 2005

(54) CORRUGATED PIPE

(75) Inventors: Timothy R. Toliver, Findlay, OH (US); Bill R. Vanhoose, Findlay, OH (US)

(73) Assignee: Hancor, Inc., Findlay, OH (US)

( * ) Notice: Subject to any disclaimer, the term of this patent is extended or adjusted under 35 U.S.C. 154(b) by 105 days.

(21) Appl. No.: 10/205,260

(22) Filed: Jul. 25, 2002

(65) Prior Publication Data

US 2004/0016468 A1 Jan. 29, 2004

(51) Int. Cl.$^7$ ............................................. F16L 55/04
(52) U.S. Cl. ........................ 138/26; 138/115; 138/120; 138/121; 138/177
(58) Field of Search ................................. 138/115, 120, 138/121, 177, 26; 405/45, 48, 49

(56) References Cited

U.S. PATENT DOCUMENTS

| | | | | |
|---|---|---|---|---|
| 1,055,674 A | * | 3/1913 | Smith ........................... | 405/49 |
| 3,625,242 A | | 12/1971 | Ostwald | |
| 3,699,684 A | * | 10/1972 | Sixt ............................... | 405/49 |
| 3,958,425 A | * | 5/1976 | Maroschak ................... | 405/49 |
| 4,163,474 A | * | 8/1979 | MacDonald et al. ......... | 165/179 |
| 4,182,580 A | * | 1/1980 | Hieda et al. ................... | 405/43 |
| 4,188,154 A | | 2/1980 | Izatt | |
| 4,950,103 A | * | 8/1990 | Justice ........................... | 405/43 |
| 5,603,358 A | * | 2/1997 | Lepoutre ..................... | 138/149 |
| 5,810,509 A | * | 9/1998 | Nahlik, Jr. .................... | 405/43 |
| 5,921,711 A | * | 7/1999 | Sipaila ......................... | 405/45 |
| 5,954,451 A | * | 9/1999 | Presby ......................... | 405/49 |
| 5,992,469 A | * | 11/1999 | Hegler ........................ | 138/109 |
| 5,996,635 A | * | 12/1999 | Hegler ........................ | 138/109 |
| 6,199,592 B1 | * | 3/2001 | Siferd et al. ................. | 138/109 |
| 6,343,623 B2 | * | 2/2002 | Hegler ........................ | 138/109 |
| 6,399,002 B1 | * | 6/2002 | Lupke et al. ................ | 264/139 |
| 6,461,078 B1 | * | 10/2002 | Presby ......................... | 405/49 |

FOREIGN PATENT DOCUMENTS

| | | |
|---|---|---|
| DE | 2133681 | 1/1973 |
| DE | 3842298 | 6/1990 |
| EP | 0890770 | 1/1999 |

OTHER PUBLICATIONS

Two sheets comprising a web–page at http://poweronline.com/content/productshowcase/product.asp, Nov. 2001.
European Search Report dated Aug. 16, 2004 for the corresponding European patent application (4 pp.) EP 03016901.

* cited by examiner

*Primary Examiner*—James Hook
(74) *Attorney, Agent, or Firm*—Jones Day

(57) ABSTRACT

A corrugation has a radially inner wall circumferentially surrounding an axis. The inner wall defines an inner cavity configured to conduct a liquid axially through the inner cavity. A radially outer wall of the corrugation overlies the inner wall. The outer wall adjoins the inner wall so as to form a closed outer cavity bounded by the inner and outer walls and separated from the inner cavity by the inner wall. The inner wall has at least one opening providing fluid communication between the inner and outer cavities for the corrugation to serve as a reservoir for the liquid.

18 Claims, 5 Drawing Sheets

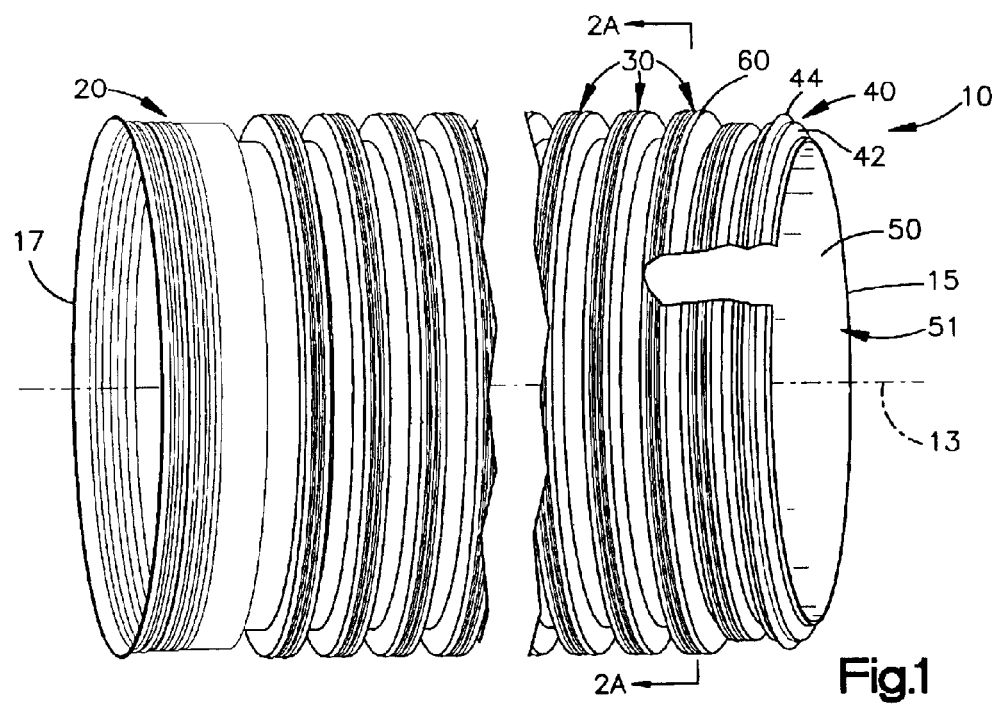
Fig.1
PRIOR ART
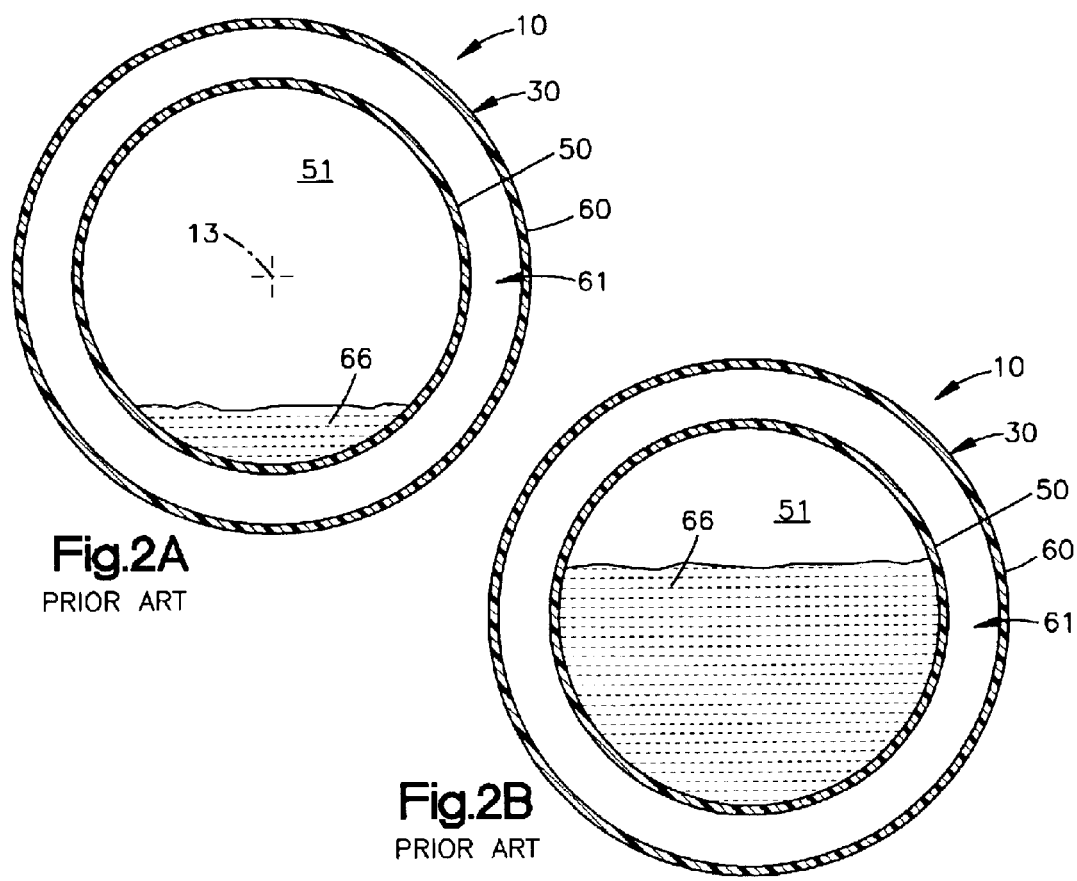
Fig.2A
PRIOR ART
Fig.2B
PRIOR ART

CORRUGATED PIPE

TECHNICAL FIELD

The present invention relates to corrugated pipes.

BACKGROUND

FIG. 1 shows a prior art flexible polyethylene corrugated pipe 10 used in an irrigation system. The pipe 10 is centered on an axis 13 and extends axially from a front open end 15 to a rear open end 17. A bell-shaped section 20, or "bell," of the pipe 10 is located at the rear end 17. The pipe 10 also includes annular corrugations 30 arranged in a linear series extending axially from the bell 20 to the front end 15. A spigot 40 of the pipe 10 comprises the front-most corrugation 42 and an annular rubber gasket 44. The spigot 40 can be inserted into the bell of another pipe (not shown) to join the pipes together with a sealed joint.

As shown in FIG. 2A, each corrugation 30 has a cylindrical inner wall 50 defining an inner cavity 51 centered on the axis 13. Additionally, each corrugation has an outer wall 60 adjoining the inner wall 50 to define a closed annular outer cavity 61 centered on the axis 13.

During use, as illustrated in FIG. 2A, water 66 is conducted axially through the inner cavity 51. A blockage can occur downstream of the pipe 10 due to, for example, a downstream valve being shut off. As the water 66 continues to flow from upstream, while being blocked from exiting downstream, the water level in the inner cavity 51 rises, as illustrated in FIG. 2B. The entire column of water flowing toward the pipe 10 has a speed and thus an inertia. The inertia can be significant, because it equals the speed of the water times the mass of the entire column of water flowing toward the pipe 10.

At some point, the water 66 can entirely fill the inner cavity 51, as illustrated in FIG. 2C. At that moment, with suddenly no more space to contain further incoming water, the inertia is suddenly dissipated by the impact of the water 66 against the inner wall 50 of the pipe 10. The impact, called water hammer, is manifested as a peak pressure within the inner cavity 51.

The pipe 10 must be designed to withstand the peak pressure, so that the pipe 10 will not rupture and the joint will not leak. This requires making the pipe walls thicker than would be necessary if the peak pressure were lower, and thus increases cost and weight of the pipe 10.

SUMMARY

An embodiment of the present invention is a corrugation. The corrugation has a radially inner wall circumferentially surrounding an axis and defining an inner cavity configured to conduct a liquid axially through the inner cavity. A radially outer wall of the corrugation overlies the inner wall. The outer wall adjoins the inner wall so as to form a closed outer cavity bounded by the inner and outer walls and separated from the inner cavity by the inner wall. The inner wall has at least one opening providing fluid communication between the inner and outer cavities for the corrugation to serve as a reservoir for the liquid.

Preferably, the inner wall is cylindrical and centered on the axis. The outer cavity is annular, centered on the axis, and fully surrounds the inner cavity. The corrugation is one of an axially extending series of such corrugations comprising a pipe. The corrugation has a predetermined installed orientation defined by a designated bottom end of the corrugation. The at least one opening comprises first and second openings, and, in the installed orientation of the corrugation, the second opening is located higher than the first opening. The corrugation is configured for a pressurized air pocket to be formed in the outer cavity by the liquid rising above the second opening.

Another embodiment of the invention is a pipe comprising a wall circumferentially surrounding an axis. The wall defines an axial-flow cavity for conducting a liquid axially through the axial-flow cavity. The pipe further comprises an axially extending series of reservoir structures. Each reservoir structure defines a closed reservoir cavity separated from the axial-flow cavity by the wall. The wall has, for each reservoir cavity, at least one opening providing fluid communication between the axial-flow cavity and the reservoir cavity.

In another embodiment, at least one lower opening in the wall provides fluid communication between the axial-flow cavity and the reservoir cavity, such that a radially outward flow of the liquid from the axial-flow cavity to the reservoir cavity occurs by the liquid in the axial-flow cavity rising above the lower opening. At least one upper opening in the wall is located above the at least one lower opening in a predetermined installed orientation of the pipe. The at least one upper opening provides fluid communication between the axial-flow cavity and the reservoir cavity, such that a pressurized air pocket is formed in the reservoir cavity by the liquid in the axial-flow cavity rising above the at least one upper opening. The pressurized air pocket opposes and slows the radially outward flow to the reservoir cavity.

BRIEF DESCRIPTION OF THE DRAWINGS

FIG. 1 is a perspective view of a prior art corrugated pipe;

FIG. 2A is a sectional view taken on line 2A—2A of FIG. 1, depicting an initial water level in the pipe;

FIGS. 2B–2C are views similar to FIG. 2A, depicting higher water levels in the pipe;

DESCRIPTION

Figure 3:
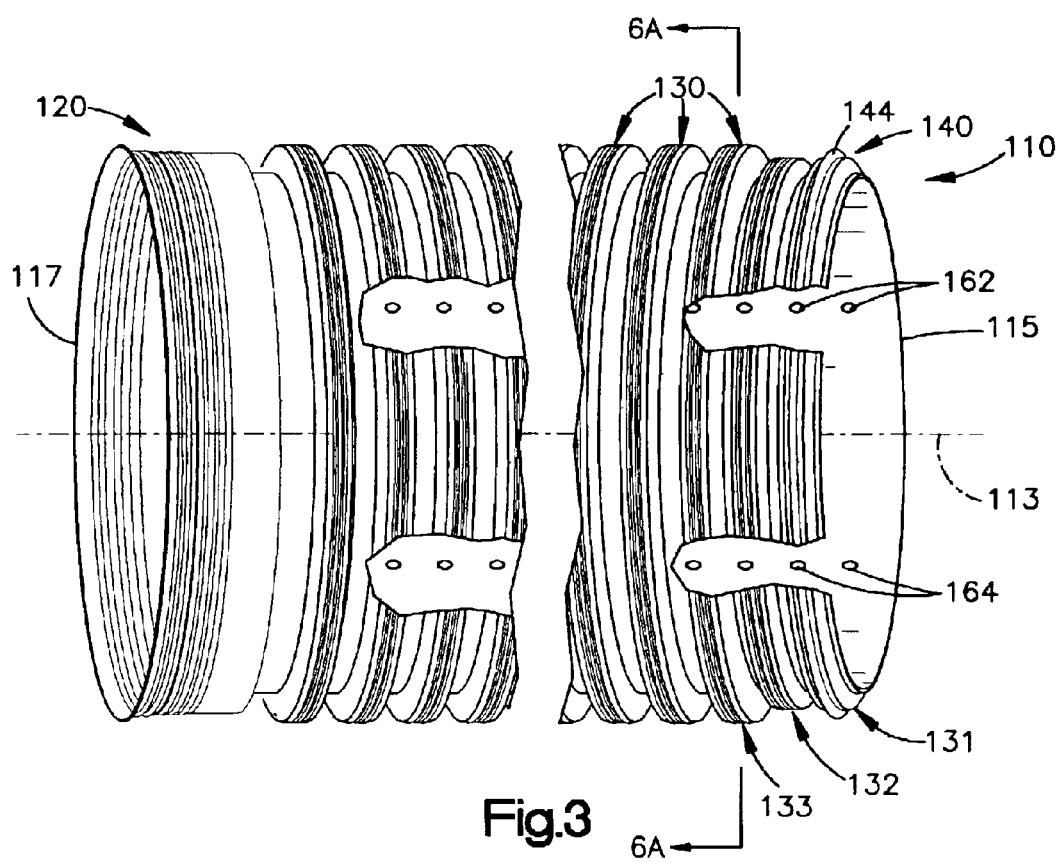
FIG. 3 is a perspective view of a corrugated pipe embodying the present invention.

The apparatus 110 shown in FIG. 3 has parts which, as described below, are examples of the elements recited in the claims.

Figure 4:
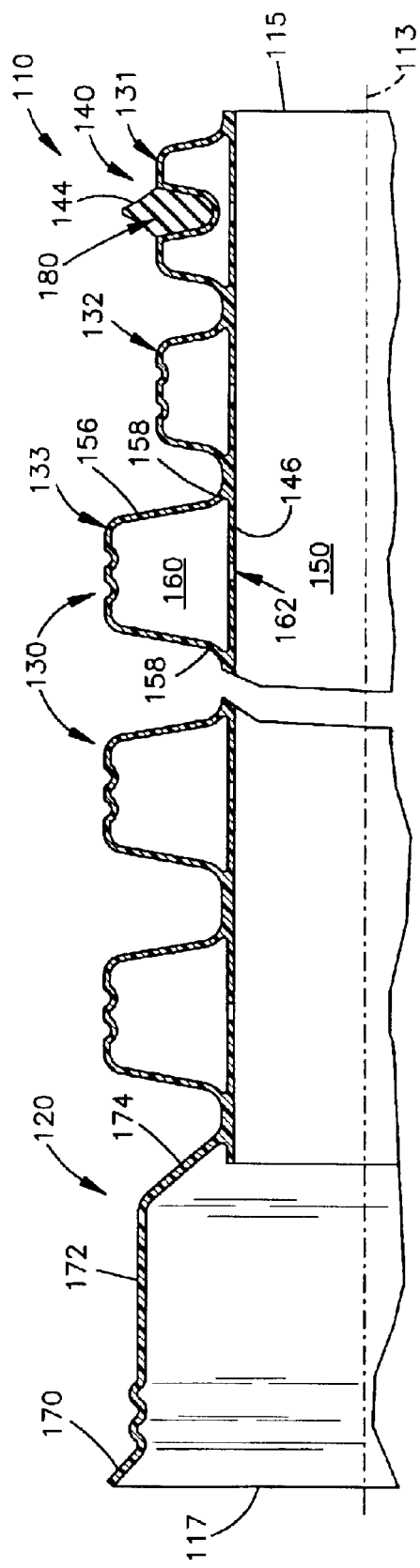
FIG. 4 is a sectional view of the pipe of FIG. 3.

The apparatus is a flexible polyethylene corrugated pipe 110 for conducting water in a system of pipes, such as an irrigation system. The pipe 110 is centered on an axis 113 and extends axially from a front open outer end 115 to a rear open outer end 117. As shown in FIG. 4, a bell 120 of the pipe 110 is located at the rear end 117. The pipe 110 also includes annular corrugations 130 arranged in a linear series extending axially from the bell 120 to the front end 115. The corrugations 130 include first, second and third corrugations 131, 132 and 133 extending consecutively and contiguously axially rearward from the front end 115. A spigot 140 of the pipe 110 comprises the first corrugation 131 and an annular rubber gasket 144.

The corrugations 130 have similar features, described as follows with reference to the third corrugation 133. Like the third corrugation 133, each corrugation 130 includes a cylindrical inner wall 146 centered on the axis 113 and defining a cylindrical inner cavity 150. Each corrugation 130 further includes an annular outer wall 156 with a generally U-shaped cross-section, centered on the axis 113 and overlying the inner wall 146. The outer wall 156 adjoins the inner wall 146 along two axially opposite annular edges 158 of the outer wall 156, to define a closed annular outer cavity 160 centered on the axis 113. The outer cavity 160 fully surrounds the inner cavity 150, and is separated from the inner cavity 150 by the inner wall 146. Upper openings 162 and lower openings 164 (FIG. 3) in the inner wall 146 provide fluid communication between the inner and outer cavities 150 and 160.

The bell 120 is centered on the axis 113 and comprises three sections, as follows. A flare section 170 extends axially and radially inward from the rear end 117. From the flare section 170, a generally cylindrical section 172 extends axially inward to an annular back wall section 174. The back wall section 174 extends axially and radially inward to the series of corrugations 130.

The spigot 140 includes the first corrugation 131 and an annular rubber gasket 144, both centered on the axis 113. The outer wall 156 of the first corrugation 131 has an annular groove 180 extending radially inward and centered on the axis 113. The gasket 144 is seated in the groove 180 and extends radially outward from the groove 180.

Figure 5:
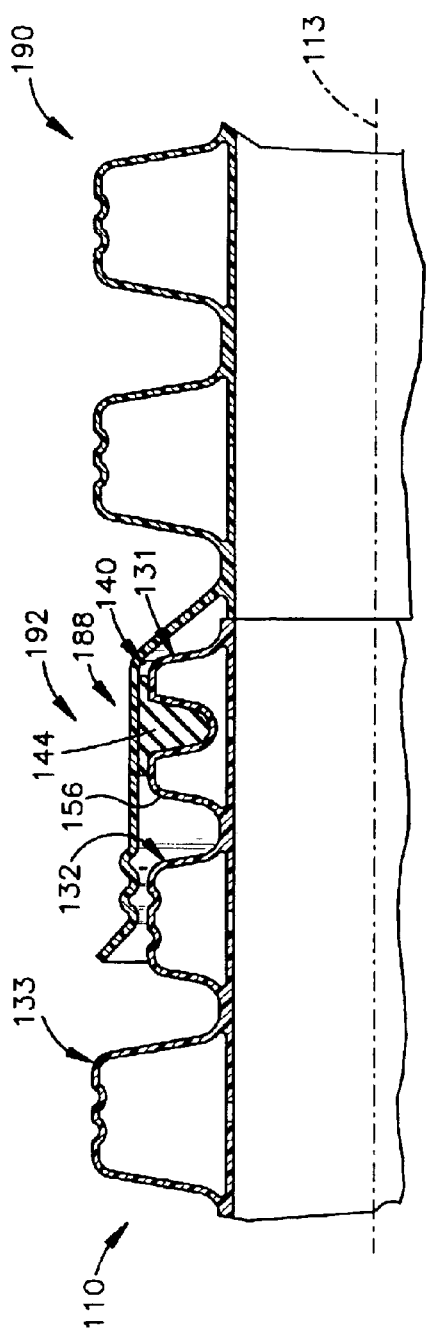
FIG. 5 is a sectional view of the pipe of FIG. 4, shown joined to another pipe.

As shown in FIG. 5, the spigot 140 is configured to be telescopically inserted into the bell 188 of another pipe 190 to join the pipes together. When the pipes 110 and 190 are joined, the gasket 144 is compressed between the first corrugation 131 and the bell 188 of the other pipe 190 to provide a sealed joint 192.

The bell 188 of the other pipe 190 receives both the first and second corrugations 131 and 132. Therefore, the first and second corrugations 131 and 132 must be short enough to fit within the bell 188 of the other pipe 110. The third corrugation 133 is not received by the bell 188 and thus can be taller, as shown. The corrugations 130 (FIG. 4) rearward of the third corrugation are similar to the third corrugation 133 in size and shape.

Figure 2C:
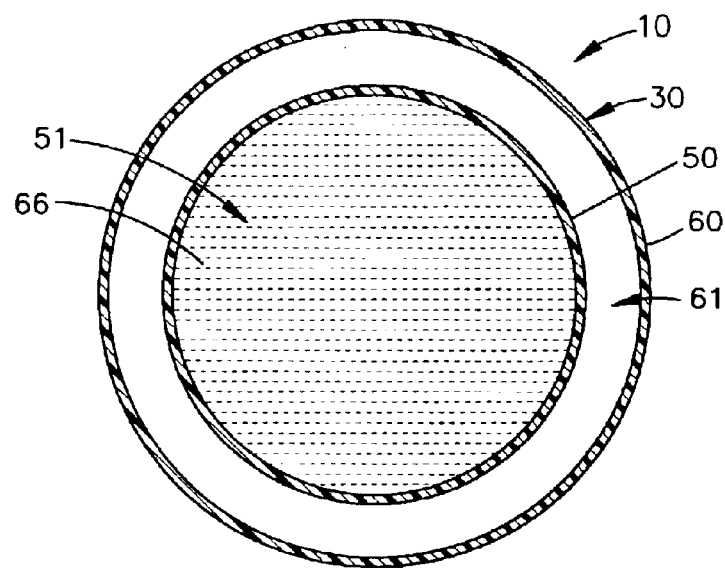
Figure 6A:
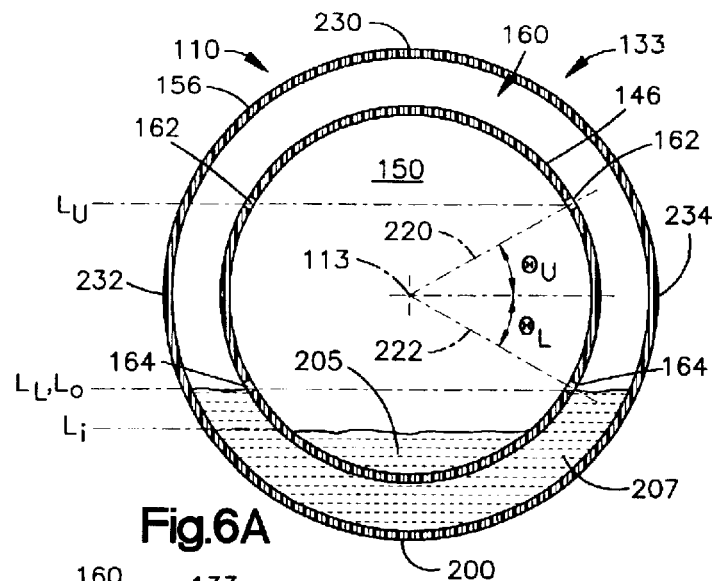
FIG. 6A is a sectional view taken on line 6A—6A of FIG. 3, depicting an initial water level in the pipe.

The pipe 110, and each corrugation 130 of the pipe 110, has a specific location designated as the bottom end 200, shown in FIG. 6A. The bottom end 200 serves as a reference from which vertical positions of the openings 162 and 164 are determined. Accordingly, the pipe 110 has a predetermined installed orientation in which the designated bottom end 200 faces down. In contrast, since the prior art pipe 10 (FIG. 2A) does not have openings in the inner wall 50, it is symmetric about its axis 13 and does not need a predetermined installed orientation or designated bottom end.

As viewed in its installed orientation shown in FIG. 6A, the lower openings 164 are located horizontally opposing each other at a level $L_L$. Similarly, the upper openings 162 are located horizontally opposing each other at a level $L_U$ higher than $L_L$. The considerations for determining the optimal levels $L_U$ and $L_L$ for the openings 162 and 164 are explained through the example illustrated in FIGS. 6A–6E. Although this example is described below with reference to the third corrugation 133, the following explanation applies to all the corrugations 130.

In the example of FIGS. 6A–6E, the pipe 110 is one of a plurality of such pipes joined together in series to form a system of pipes, such as an irrigation system. The dimensions shown for the cross-sections in these and the other figures are for illustration purposes, and actual pipes that incorporate the present invention may vary relative to the dimensions shown. From upstream, a column of water 205 flows downstream to and through the pipe cavity 150.

The level of the water 205 in the inner cavity 150 is herein referred to as the inner water level $L_i$. As shown in FIG. 6A, the inner water level $L_i$, is below the lower openings 164. Therefore, the water 205 cannot enter the outer cavity 160 through the openings 164. Nevertheless, the outer cavity 160 in this example contains residual water 207 to an outer water level $L_o$ equal to the level $L_L$ of the lower openings 164. This residual water 207 is water remaining after the water 205 in the inner cavity 150 was previously elevated and flowed through the openings 164 into the outer cavity 160.

In this example, due to a blockage downstream from the pipe 110, the inner water level $L_i$, starts to rise. Each successive figure of FIGS. 6B–6E depicts a successively higher inner water level $L_i$ due to the blockage.

Figure 6B:
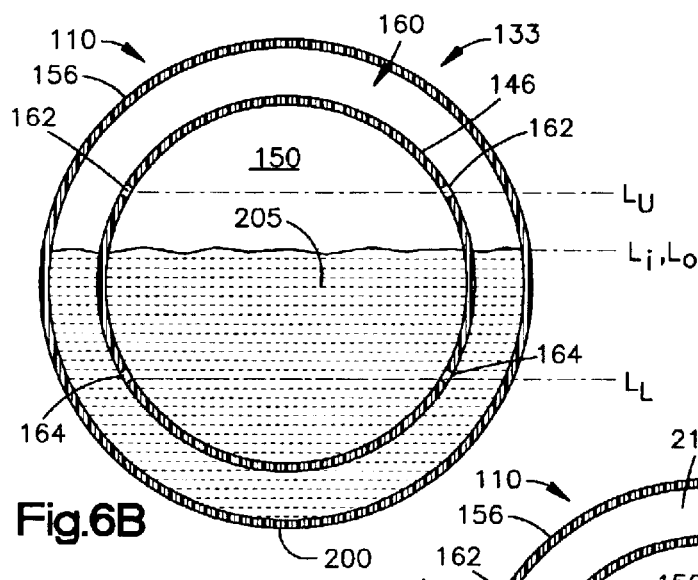
FIGS. 6B–6E are views similar to FIG. 6A, depicting higher water levels in the pipe.

In FIG. 6B, the inner water level $L_i$ has risen above the lower openings 164, but remains below the upper openings 162. As the inner water level $L_i$ rises, the water 205 flows radially outward through the lower openings 164 to the outer cavity 160. As the outer water level $L_o$ rises in unison with the inner water level $L_i$, air in the outer cavity 160 can flow radially inward through the upper openings 162 to the inner cavity 150. This keeps the air pressure in the outer cavity 160 equal to the air pressure in the inner cavity 150, which is atmospheric pressure. Therefore, as long as the inner water level $L_i$ is below the upper openings 162, the air in the outer cavity 160 is not pressurized, i.e., raised above atmospheric pressure, and the outer water level $L_o$ equals the inner water level $L_i$.

Figure 6C:
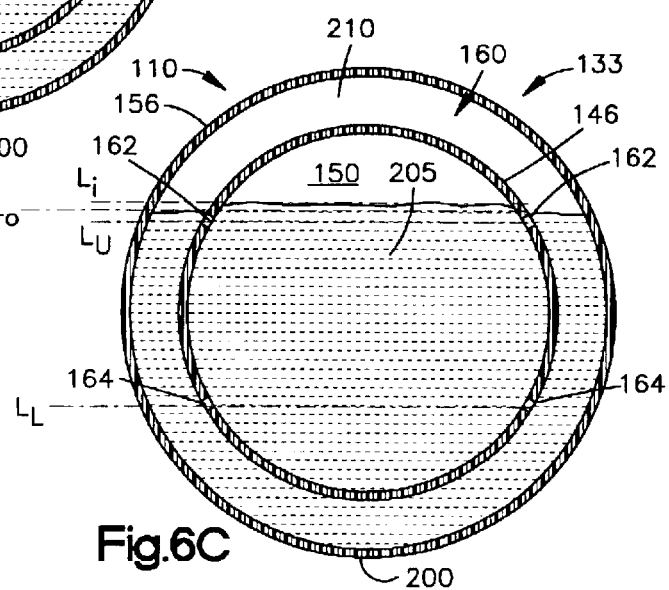

FIG. 6C shows the pipe 110 soon after the water 205 has risen above the upper openings 162, giving rise to an air pocket 210 in the outer cavity 160. The air pocket 210 is pressurized by the hydrostatic pressure of the water 205 in the inner cavity 150. As the inner water level $L_i$ progressively rises, the pressurization progressively increases. Concurrently, the air pocket 210 is progressively compressed, thereby providing room for water influx. The pressurization of the air pocket 210 opposes and thus slows the radially outward flow of water 205 into the outer cavity 160. Therefore, the outer water level $L_o$ is lower than the inner water level $L_i$.

Figure 6D:
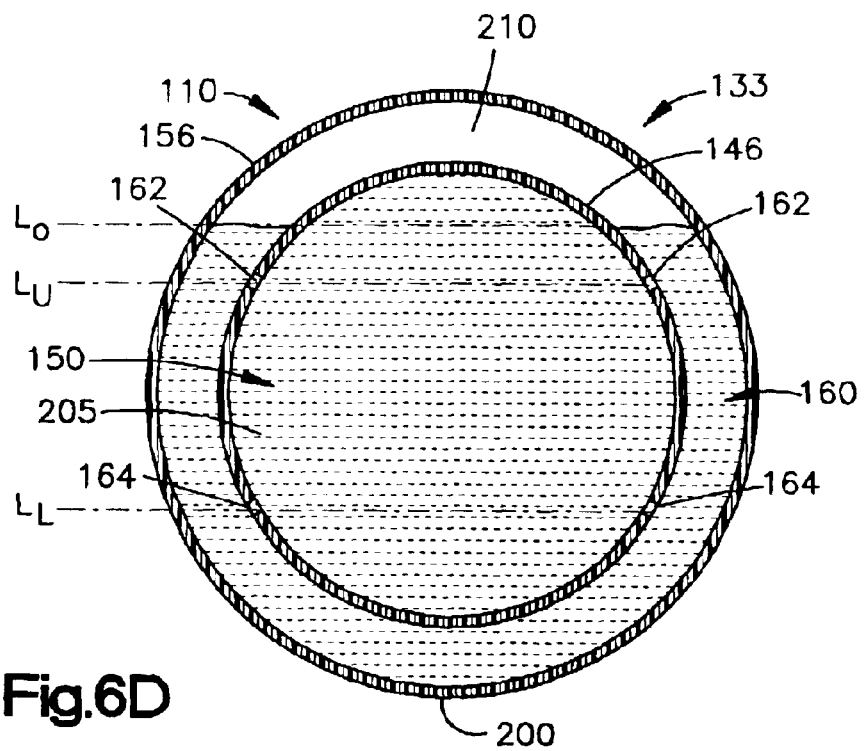

FIG. 6D shows the pipe 110 at the moment the water 205 has filled the entire inner cavity 150. Although the inner cavity 150 is full, inertia of the entire water column flowing axially forward toward this pipe 110 continues to drive the water 205 into the pipe 110. The water 205 is then forced radially outward through the openings 162 and 164 into the outer cavity 160. The radially outward flow through the openings 162 and 164 enables the axially forward flow to continue despite the inner cavity 150 being full. Room for the radially outward flow is provided in the outer cavity 160 by the air pocket 210 being progressively pressurized and compressed. However, the progressively increasing pressure of the air pocket 210 opposes and thus gradually slows the radially outward flow of the water 205 into the outer cavity 160. This, in turn, gradually slows the axially forward flow of water into the inner cavity 150. The inertia is thus dissipated gradually.

Figure 6E:
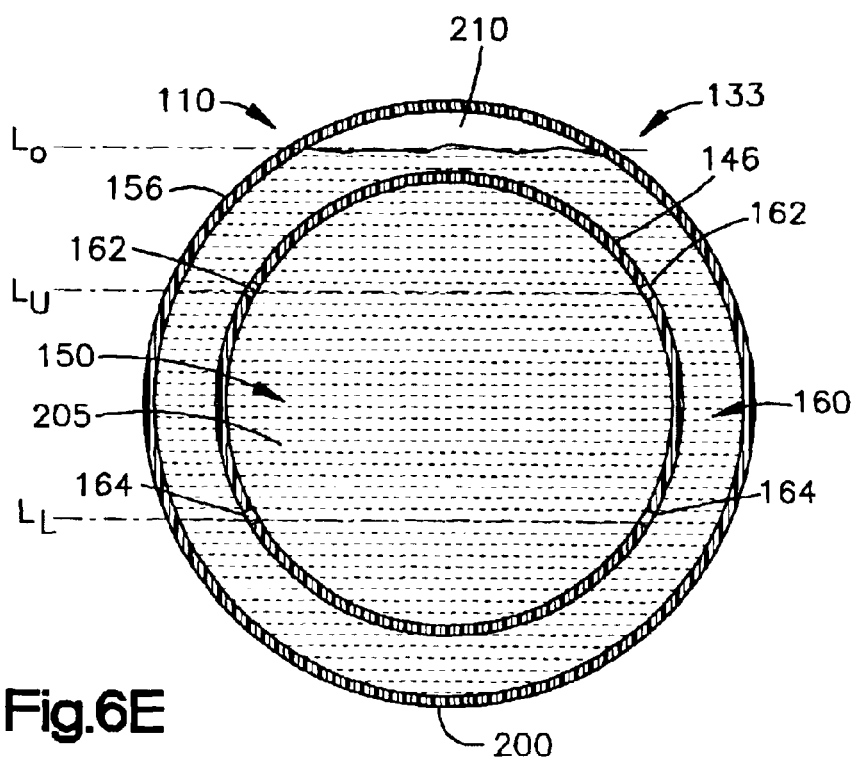

FIG. 6E shows the pipe 110 at the moment the axially forward and radially outward flows of water 205 have slowed to a stop. At this instant, the air pocket 210 reaches a maximally compressed volume. Simultaneously, the inner and outer cavities 150 and 160 reach a peak pressure as the inertia reaches zero. The peak pressure is lower than in the prior art pipe 10 (FIG. 2C), thereby producing less or no water hammer, because the inertia has been dissipated gradually.

After the moment depicted in FIG. 6E, the pressure in the air pocket 210 forces some of the water 205 in the outer cavity 160 back into the inner cavity 150. This causes the water 205 in the inner cavity 150 to flow back upstream to a limited extent before stopping. The pressure in the inner cavity 150 is thus reduced to a level below the peak pressure.

In this example, the downstream blockage is eventually removed. The inner water level $L_i$ recedes back to the level depicted in FIG. 6A, below the level $L_L$ of the lower openings 164. Concurrently, the water 205 held in the outer cavity 160 empties back into the inner cavity 150 through the openings 162 and 164. The outer water level $L_o$ thus recedes back to the level $L_L$ of the lower openings 164. Since the section of the outer cavity 160 below level $L_L$ is typically permanently filled with water (with variations due to evaporation), this section is not part of the reservoir volume.

The above example illustrates at least four effects provided by the invention. The first effect is the reservoir effect, illustrated in FIG. 6B, in which the lower openings 164 enable the radially outward flow of the water 205 from the inner cavity 150 to the outer cavity 160. This effect provides a reservoir that temporarily holds a portion of the water 205 whenever the inner water level $L_i$ is above the level $L_L$ of the lower openings 164. The reservoir volume comprises the volume of the outer cavity 160 from the lower openings 164 to the bottom of the maximally compressed air pocket 210 (FIG. 6E). The reservoir volume is provided by every corrugation along the length of the irrigation system, if those corrugations embody the invention. Therefore, the total volume of the reservoir can be substantial, and thus capable of taking up a large influx of water. The reservoir effect is operative from the time the water rises above the lower openings 164 until it stops flowing.

The second effect is the gradual slowing of the radially outward flow of the water 205 to the outer cavity 160. In this gradual slowing effect, illustrated in FIG. 6C, the gradually increasing pressure of the air pocket 210 gradually opposes and slows the radially outward flow of the water 205 into the outer cavity 160. This effect is operative from the time the inner water level $L_i$ surpasses the upper holes 162, which is when the pressurized air pocket 210 is formed, until the water 205 stops flowing. Consequently, the air pocket 210 and the accompanying slowing effect start to occur after the reservoir effect has been operative for some period of time.

The third effect is the damping effect to reduce or eliminate water hammer. In this effect, illustrated in FIG. 6D, the aforementioned gradual slowing of the radially outward flow from the inner cavity 150 gradually slows the axially forward flow into the inner cavity 150. Since the inertia is dissipated gradually, water hammer is reduced or eliminated. Understandably, the inertia of the entire water column upstream of the pipe 110 can be substantial. Nevertheless, the present invention can dissipate the substantial inertia gradually, because the damping effect is provided by every corrugation along the length of the irrigation system, if those corrugations embody the invention. The damping effect is operative from the moment the water 205 just fills the inner cavity 150 until it stops flowing.

The fourth effect is tightening of the seal of the joint 192, illustrated in FIG. 5. This effect applies only to the spigot corrugation 131 and entails the increased pressure in the outer cavity 160 slightly expanding the outer wall 156. This expansion increases the compression of the gasket 144 against the bell 120. The seal is thus tightened when it is needs tightening most—when the cavities 150 and 160 are pressurized. This seal tightening effect is operative the entire time the water 205 in the inner cavity 150 is completely filled with water.

Determining the level $L_U$ of the upper openings 162 in FIG. 6A is based on two considerations. On the one hand, the lower the upper openings 162, the greater the damping effect. On the other hand, the higher the upper openings 162, the smaller the air pocket 210 (FIG. 6E), and thus the greater the reservoir effect. Preferably, the upper openings 162 are located at an angle $\Theta_U$ of 0–90 degrees, and more preferably about 35 to about 55 degrees, above the axis 113, as illustrated by imaginary line 220.

Determining the level $L_L$ of the of lower openings 164 is also based on two considerations. On the one hand, the lower the lower openings 164, the greater the reservoir effect. On the other hand, the higher the lower openings 164, the less likely they are to be plugged with sediment in the water 205, accumulated at the bottom of the cavity 150. Therefore, a determination of the level $L_L$ of the lower openings 164 is based on the level of the sediment or sludge that the pipe 110 is likely to encounter during use. Preferably, the lower openings 164 are located at an angle $\Theta_L$ of 0–90 degrees, and more preferably about 35 to about 55 degrees, below the axis 113, as illustrated by imaginary line 222.

Preferably, the angles $\Theta_L$ and $\Theta_U$ are approximately equal. The openings 162 and 164 are then spaced approximately symmetrically about the axis 113 such that rotating the pipe 110 by 180 degrees about the axis 113 yields an equivalent configuration. Therefore, in addition to the first bottom end 200 described above, the pipe 110 has a second designated bottom end 230 located opposite the first designated bottom end 200. The pipe 110 thus has two predetermined installed orientations, comprising a first orientation in which the first bottom end 200 faces down and a second installed orientation in which the second bottom end 230 faces down.

More preferably, the angles $\Theta_L$ and $\Theta_U$ are both equal to about 45 degrees. The openings 162 and 164 are then spaced symmetrically about the axis 130 such that rotating the pipe 110 by 90 degrees about the axis 113 yields an equivalent configuration. The pipe 110 of such an embodiment thus has four designated bottom ends 200, 230, 232 and 234 located 90 degrees apart from each other. The pipe 110 then has four corresponding predetermined installed orientations. In each of the four installed orientations, one of the designated bottom ends 200, 230, 232 and 234 faces down.

Determining the size of the openings 162 and 164 is based on the anticipated rate of the axial flow. A faster rate requires a larger opening to more quickly equalize the pressure and water level between the inner and outer cavities 150 and 160.

While the invention has been described with reference to a polyethylene pipe, other types of pipes may also benefit from the invention, the invention not being limited to a particular type of material. Furthermore, while specific corrugation shapes are shown, the invention is not limited to a particular shape or size of corrugation. In addition, an exemplary shape and size is shown for the bell and spigot of the pipe. However, other bell and spigot shapes and sizes may also be utilized with the invention.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

What is claimed is:

1. A corrugation comprising:
   a radially inner wall circumferentially surrounding an axis and defining an inner cavity configured to conduct a liquid axially through said inner cavity; and
   a radially outer wall overlying said inner wall, said outer wall adjoining said inner wall so as to form an outer cavity bounded by said inner and outer walls and separated from said inner cavity by said inner wall and closed to the outside by said outer wall;
   said inner wall having first and second openings providing fluid communication between said inner and outer cavities such that said corrugation provides a reservoir for the liquid conducted through said inner cavity;
   said corrugation having a predetermined installed orientation defined by a designated bottom end of said corrugation;
   said second opening being located higher than said first opening in said installed orientation of said corrugation; and
   said corrugation being centered on said axis and, in said installed orientation of said corrugation, said first opening is located at an angle of about 35 to about 55 degrees below said axis, and said second opening is located at an angle of about 35 to about 55 degrees above said axis.

2. The corrugation of claim 1 wherein said inner wall is cylindrical and centered on said axis.

3. The corrugation of claim 1 wherein said outer wall is annular and centered on said axis.

4. The corrugation of claim 1 wherein said outer cavity fully surrounds said inner cavity.

5. The corrugation of claim 1 wherein said corrugation is a spigot corrugation.

6. The corrugation of claim 1 wherein said first and second openings are two of multiple such openings spaced symmetrically about said axis.

7. The corrugation of claim 1 further comprising a another such opening located horizontally opposing and level with said first opening in said installed orientation of said corrugation.

8. The corrugation of claim 1 configured for a pressurized air pocket to be formed in said outer cavity by the liquid rising above said second opening.

9. A pipe comprising an axially extending series of corrugations as defined in claim 1.

10. The pipe of claim 9, wherein said first openings are on a common lower horizontal plane and said second openings are on a common upper horizontal plane.

11. A pipe comprising:
    a wall circumferentially surrounding an axis and defining an axial-flow cavity for conducting a liquid axially through said axial-flow cavity;
    a reservoir structure defining a reservoir cavity separated from said axial-flow cavity by said wall and closed to the outside;
    a lower opening in said wall providing fluid communication between maid axial-flow cavity and said reservoir cavity, such that a radially outward flow of the liquid from said axial-flow cavity to said reservoir cavity through said lower opening occurs by the liquid in said axial-flow cavity rising above said lower opening; and
    an upper opening in said wall located above said lower opening in a predetermined installed orientation of said pipe, said upper opening providing fluid communication between said axial-flow cavity and said reservoir cavity, such that a pressurized air pocket is formed in said reservoir cavity by the liquid in said axial-flow cavity rising above said upper opening, said pressurized air pocket opposing and slowing said radially outward flow to said reservoir cavity.

12. The pipe of claim 11 wherein said wall is cylindrical and centered on said axis.

13. The pipe of claim 11 wherein said reservoir structure is one of an axially extending series of such reservoir structures of said pipe.

14. The pipe of claim 13 further comprising, for each reservoir cavity, a second such upper opening facing said first upper opening and a second such lower opening facing said first lower opening, wherein said upper openings are all located on a common upper horizontal plane and said lower openings are all located on a common lower horizontal plane.

15. The pipe of claim 11 wherein said reservoir structure is a corrugation of a corrugated pipe and includes said wall.

16. The pipe of claim 11 wherein said wall is centered on said axis and, in said installed orientation of said pipe, said lower opening is located at an angle of about 35 to about 55 degrees below said axis, and said upper opening is located at an angle of about 35 to about 55 degrees above said axis.

17. A method of using the pipe of claim 11, comprising:
    installing said pipe, for conduction of liquid through said pipe, in an orientation in which a pressurized air pocket will be formed in said reservoir cavity by the liquid in said axial-flow cavity rising above said upper opening and said pressurized air pocket will oppose and slow said radially outward flow to said reservoir cavity.

18. A spigot corrugation comprising:
    a radially inner wall circumferentially surrounding an axis and defining an inner cavity configured to conduct a liquid axially through said inner cavity; and
    a radially outer wall overlying said inner wall, said outer wall adjoining said inner wall to form a spigot corrugation of a corrugated pipe with an outer cavity bounded by said inner and outer walls and separated from said inner cavity by said inner wall and closed to the inside by said outer wall;
    said inner wall having an opening providing fluid communication between said inner and outer cavities such that said spigot corrugation provides a reservoir for the liquid conducted through said inner cavity.

* * * * *

UNITED STATES PATENT AND TRADEMARK OFFICE
CERTIFICATE OF CORRECTION

PATENT NO. : 6,941,972 B2
DATED : September 13, 2005
INVENTOR(S) : Timothy R. Toliver and Bill R. Vanhoose It is certified that error appears in the above-identified patent and that said Letters Patent is hereby corrected as shown below:

Column 7,
Line 47, "comprising a another" should read -- comprising another --; and Column 8,
Line 5, "maid" should read -- said --.

Signed and Sealed this

Fourteenth Day of February, 2006

JON W. DUDAS
*Director of the United States Patent and Trademark Office*